United States Patent [19]
Daude et al.

[11] Patent Number: 5,431,966
[45] Date of Patent: Jul. 11, 1995

[54] PROCESS FOR ENAMELLING A GLASS SUBSTRATE

[75] Inventors: Gerard Daude, Villenave D'Ornon; Cathy Dievart; André Beyrle, both of Tracy le Val, all of France

[73] Assignee: Saint-Gobain Vitrage, Courbevoie, France

[21] Appl. No.: 91,815

[22] Filed: Jul. 13, 1993

Related U.S. Application Data

[63] Continuation-in-part of Ser. No. 826,414, Jan. 27, 1992, abandoned.

[30] Foreign Application Priority Data

Jan. 25, 1991 [FR] France ................................. 91 00871

[51] Int. Cl.⁶ .............................................. B05D 3/02
[52] U.S. Cl. .................................... 427/553; 427/375; 427/379
[58] Field of Search .......................... 427/553, 375, 379

[56] References Cited

U.S. PATENT DOCUMENTS 5,120,570 6/1992 Boaz ..................................... 427/553

*Primary Examiner*—Bernard Pianalto
*Attorney, Agent, or Firm*—Oblon, Spivak, McClelland, Maier & Neustadt

[57] ABSTRACT

The invention concerns a procedure for the fabrication of an enamel layer on a glass sheet. In accordance with the process, at least one portion of the drying operation is effected by microwaves, the enamel layer advantageously containing a microwave doping agent.

20 Claims, No Drawings

PROCESS FOR ENAMELLING A GLASS SUBSTRATE

This application is a Continuation-in-Part of U.S. application Ser. No. 07/826,414, filed Jan. 27, 1992, abandoned.

BACKGROUND OF THE INVENTION

1. Field of the Invention

The present invention concerns the deposit of enamel on a glass substrate, especially on a window. It concerns, in particular, a new process for fabrication of an enamelled layer on a glass substrate. It also concerns an enamel composition to be used for fabrication of a layer on a glass substrate.

2. Discussion of the Background

By enamel is meant, according to the invention, both the enamel composition, or paste, used for the deposit, and the enamel layer formed at different stages of the fabrication process, as described below.

Enamels are well known in the state of the art and are used, in particular, on glass substrates, such as vehicle or building windows or mirrors. Enamels are also used to form borders, decorative layers, protective layers, especially for adhesive layers used for mounting windows, e.g., windshields or rear windows, in body sashes, or for mounting accessories, e.g., rear-view mirror support bases, or as protective layers for collector strips of heating systems.

The enamel used for these applications is generally formed from a powder containing a glass frit, metallic oxide-based pigments used as coloring agents, a medium, also called a vehicle, generally containing a binding agent allowing adhesion of the enamel to the glass during enamel deposit, and a solvent or organic diluting agent allowing the desired viscosity to be reached for application of the composition on the substrate.

This application can be carried out using various procedures, such as spraying, silk-screening, coating with a roller, etc. Use is preferably made of silk-screening, which makes it possible to obtain quite varied and reproducible shapes and layer structures.

To manufacture the enamelled layer, enamel is preferably deposited on the substrate by silk-screening. The moist layer thus formed is dried until this layer possesses adhesion to glass and general resistance sufficient to ensure that, as required, the window can be handled without the appearance of marks on the layer formed. Other layers may potentially be deposited, then dried, and the enamelled layer or layers thermally treated at high temperature in order to vitrify the enamel and obtain the final coating. This high-temperature vitrification treatment is generally associated with the thermal treatment used to transform the glass sheet, for example for bending the glass sheet into a convex shape.

Drying of the enamel corresponds either to the removal of the solvent or diluting agent from the medium, infrared (IR) heating being generally used for this purpose; or hardening by polymerization using UV radiation, depending on the enamel composition employed. These types of drying operations have disadvantages. For example, IR drying wastes energy. It also requires an extended drying line, and further poses the problem of the evaporation of organic solvents and of environmental protection.

UV drying can be used only for an enamel containing organic compounds which are polymerized under the effect of the UV radiation, and, in particular, acrylic compounds. The problem of the harmfulness of these products is once again raised. Furthermore, it was recently shown that the use of UV radiation led to the production of ozone. In addition, polymerization using UV radiation can be used only for the manufacture of very thin enamel layers, which are generally too thin to be used as the enamelled border of an automobile window, for example, since they are not sufficiently opaque.

The present invention remedies the disadvantages cited. It provides a new procedure for manufacture of at least an enamel layer over at least one part of a glass substrate, in particular a window. This procedure is fast, saves energy, and reduces environmental risks.

In addition to the advantages already indicated, since microwave energy is preferably absorbed by the enamel composition but only to a limited extent by the glass substrate, energy savings are realized; in addition, because of the resulting limited rise in the temperature of the substrate, the final substrate-cooling phase, which often proves necessary during an infrared drying operation, can be eliminated, or at least shortened.

SUMMARY OF THE INVENTION

According to the invention, the enamel deposited on the glass substrate is dried, at least partially, using microwaves.

Another object of the invention is to provide an enamel compound containing a powder formed from a frit and pigments present in the proportion of approximately 60 to 90% by weight of the total weight of the enamel composition, an aqueous medium formed from a binding agent allowing bonding with the glass, a diluting agent or solvent for realizing the desired viscosity, of which one part is water; and, potentially, at least one microwave doping agent in the proportion of 1–40% by weight, preferably 3–20%, and most preferably 3–10% by weight.

The present invention also provides a new process for enamelling a glass substrate, in particular a window. In this process, an enamel composition containing at least one component capable of absorbing microwave energy is deposited over at least a portion of the glass surface, then the layer thus formed is dried at least partially by microwave heating, and finally, the enamel layer is melted, or vitrified.

DETAILED DESCRIPTION OF THE PREFERRED EMBODIMENT

The term "glass substrate" signifies, according to the invention, both a bare glass substrate and a glass substrate previously coated with one or several enamel layers.

To ensure that microwave heating produces the desired effects, at least one of the constituents present in an appreciable quantity must be able to absorb this microwave energy and transform it into the Joule effect.

The enamel composition that can be used according to the invention thus contains, as one of its features, a medium containing water, and preferably an aqueous medium. Because of the high dielectric loss of water molecules, water is especially effective in absorbing microwave energy and thus becomes, when an aqueous medium is used, a diluting agent better suited to the process according to the invention than is an organic solvent.

In order to further increase drying speed and according to one of the invention features, the enamel compound may contain an appreciable quantity of a constituent other than water which can absorb microwave energy, and which will be termed a "microwave doping agent" in the following description.

The term "enamel compound" also signifies, according to the invention, a compound containing a silver paste, i.e., a compound in which the pigments are normally replaced by silver and/or, as required, other metals.

The microwave doping agent can be any product having a high dielectric loss and producing no negative or harmful action on the other enamel constituents or harmful effect on the other steps in the enamelling process. The doping agent may advantageously be chosen from among the following products: $PbS$, $Fe_3O_4$, $CuO$, $NiO$, $MnO_2$, $Cr_2O_3$, carbon black, graphite, ferrites, copper sulfide, silicon carbide or a mixture of these products.

The aqueous medium is a solution or dispersion in water of at least one binding agent chosen in particular from among the polyethyleneglycols, styrene-butadiene, ligno-sulfonates, alkyd resins, or from among other binding agents such as those conventionally known and used in the paint industry. Polyethyleneglycols are preferred and are advantageously mixed with styrene-butadiene.

When a mixture of polyethyleneglycols and styrene-butadiene is used, the adhesiveness of the composition to the glass is improved over the use of polyethyleneglycols alone. The proportions between the two constituents may vary widely and may depend on the quantity of water in the medium. However, preference is given to a mixture with about 10–40% by weight of styrene-butadiene and about 90-60% polyethyleneglycols, when it is desired that the enamelled composition have a life after preparation which is long enough to be compatible with industrial requirements, and without adding large quantities of water.

Water is generally present in the medium in a proportion of up to about 10% by weight. It comes from preparations of the organic mixtures used and/or from water, which may be added to adjust the composition to the desired viscosity.

The enamelled composition according to the invention must, furthermore, lend itself to the proposed deposit technique. Since silk-screening is preferably used, the composition must then possess an appropriate viscosity, e.g., 5 to 80 Pas, and contain only constituents whose granulometry is less than the size of the mesh, e.g., less than 20 $\mu$m. Furthermore, it must not dry too rapidly, and must, in particular, not already be dried on the serigraphy screen.

Thus, according to one of the aspects of the invention, additives are included in the enamel composition in order to prevent excessively rapid drying of the composition on the silkscreen cloth. These additives include, for example, microsilicas possessing a hydrophobic surface, which have, in addition, the advantage of adjusting the rheology of the enamelled paste for application on the substrate, while imparting to it the desired fluidity.

Conventional powders for the manufacture of enamelled layers on glass are generally well suited to the process according to the invention, which uses microwave drying. One of the advantages of the invention is precisely the opportunity to use well-known formulations for the powder which will ultimately give an enamelled layer having the desired mechanical and optical properties, in particular as regards appearance. Conventional enamel formulations are disclosed, for example, in Kirk-Othmer *Encyclopedia of Chemical Technology*, 3rd Ed., John Wiley and Sons, New York, 1978, incorporated herein by reference.

The enamel composition may, in addition, contain other additives or agents, especially dispersing agents for the powder in the medium.

Microwave drying according to the invention may, as required, be combined with infrared drying or drying by blown hot air. In these combinations, the advantage of microwave drying is preserved, in particular a shorter drying-line length than that of an exclusively infrared drying line.

The particularly advantageous combination of a microwave drying operation and a blown hot air drying operation may be achieved by alternating sequences of microwave drying and of hot air drying. These two types of drying operations are advantageously combined so as to act simultaneously. In this case, the effectiveness of the drying operation is further improved by using sequences of combined drying (action)—nothing (absence of action of the microwaves and blowing)—combined drying action—nothing, etc.

The temperature of the hot air is advantageously low so as not to heat the substrate to a high temperature. An air temperature of between 30° and 90° C., and preferably between 50° and 80° C. is generally used.

According to the invention, drying time may be reduced to more than 50% of the time needed by an exclusively infrared drying procedure. This gain in drying time for an equivalent energy output, between infrared drying and drying according to the invention, depends on the enamelled composition used, and, in particular, on the choice of the microwave doping agent, and also on the thickness of the enamelled layer formed.

The drying procedure according to the invention may be implemented using the apparatus described in European Patent Publication No. 446 114, from which the skilled specialist may derive the necessary disclosure adapted to drying enamel on a glass substrate. When one wishes to dry the enamel layer using a combination of microwave drying and hot-air drying, microwaves are preferably fed into the applicator incorporating a parallelepiped-shaped wave-guide cavity, laterally in relation to the axis of the device and perpendicularly to the air feed into said applicator, in which case the hot air is then fed perpendicularly to the surface of the enamelled layer to be dried. The device may be equipped with several applicators which are arranged in succession and which may be separated by varying spacings, e.g., of approximately 10 to 30 cm.

Other advantages and features of the invention will emerge from the following examples which are not intended to be limiting:

EXAMPLE 1

An enamel composition was prepared by mixing 80 parts by weight of a powder containing at least a portion of the principal constituents widely used in the enamel industry for glass substrates ($SiO_2$, $Al_2O_3$, $Fe_2O_3$, $MnO$, $MgO$, $CaO$, $B_2O_3$, $TiO_2$, $K_2O$, $Na_2O$, $PbO$, $CuO$, $CrO$); 12 parts by weight of a medium in the proportion of 10 parts by weight of aqueous solution containing 33% by weight of a mixture of polyethyleneglycols and 2 parts by weight of an aqueous solution containing 50% by weight styrene-butadiene; and 0.2 parts by weight of a dispersing agent, the number of parts of $SiO_2$ added to the parts of $Al_2O_3$ being, in this example, greater than 50 parts for a total of 100 parts.

The composition was applied by serigraphy on a glass sheet of test-specimen size at ambient temperature—i.e., approximately 20° C., so as to form a moist enamelled strip of 30 μm thickness. The glass sheet was inserted in a multimode microwave oven so as to be subjected to microwave energy of 350 W for 45 seconds.

The strip was dry when removed from the oven. The temperature of the glass surface opposite the layer was 46° C.

Control Example 1

The procedure used in Example 1 was repeated, except that infrared drying for 45 seconds at the same energy output was used. When removed from the oven, the enamelled strip was not completely dry and the temperature measured on the glass surface was 52° C.

When compared with Example 1, this example shows that microwave drying makes it possible to shorten the duration of this operation and that, furthermore, it limited the rise in temperature of the substrate.

EXAMPLE 2

The procedure used in Example 1 was repeated, except that a microwave doping agent was added to the enamelled composition, i.e., 15 parts by weight of a dispersion containing 50% by weight of carbon black, the other constituents and quantities remaining unchanged, and the drying time was reduced to 30 seconds. When removed from the oven, the enamelled strip was dry and the temperature of the glass surface, 47° C.

In comparison with Example 1, a reduction in the drying time of the enamel containing a microwave doping agent was observed.

EXAMPLE 3

The procedure in Example 1 was repeated, except that ferrite was added as doping agent to the enamelled composition, in the proportion of 6 parts by weight, the other constituents and quantities remaining unchanged, and the drying time was reduced to 40 seconds.

The ferrite used had the composition $Ni_xZn_{1-x}Fe_2O_4$, where $0.4 < x < 0.6$ and had a spinel structure.

After baking, the enamelled strip was dry, and the glass surface temperature, 42° C.

EXAMPLE 4

The procedure in Example 1 was repeated, except that a mixture of carbon black in the proportion of 10 parts by weight of a 50% dispersion and ferrite in the proportion of 6 parts by weight was added, the other constituents and quantities remaining unchanged, the drying time was reduced to 30 seconds. When removed from the oven, the enamelled strip was dry, and the glass temperature was 39° C.

The carbon black/ferrite mixture reduced the risk of porosity of the enamelled layer, in comparison with a layer containing only carbon black as microwave doping agent.

EXAMPLE 5

The procedure in example 4 was followed, except that 2 parts micro-silica having a hydrophobic surface were added. Improved life of the enamel composition was observed before use, its life increasing from approximately 1 hour to 2 hours, as was a greater ease of application.

EXAMPLES 6 AND 7

The procedure in Examples 4 and 5 was repeated, except that the styrene-butadiene in the medium was replaced by a dispersion of a polymer of an methacrylic acid ester. The drying operation and the layer formed were completely satisfactory.

EXAMPLE 8

The compound in Example 1 was applied, using the silkscreen process, on an automobile window at a temperature of approximately 20° C., so as to form a frame-shaped enamelled strip 30 μm thick. The window is placed in a drying device, or oven, combining microwave action with hot-air blowing action at 70° C. This device comprises four microwave applicators generating 2000 watts. These applicators are arranged in succession and are spaced apart by a distance of approximately 15–20 cm. Between each applicator, the window undergoes hot-air blowing. Drying time is 70 seconds.

The window can be handled after leaving the device, since the enamel layer is dry and the temperature of the glass, approximately 50° C.

EXAMPLE 9

The procedure carried out in Example 8 was repeated, except that the window was transported to a drying apparatus combining microwave action and hot-air blowing at 70° C. In this example, this apparatus was equipped with four applicators incorporating a parallelepiped-shaped wave-guide cavity, spaced approximately 20 cm from each other. A blown hot-air conduit empties into the wave-guide cavity, at the center within each applicator and above the window. The two types of drying operations were carried out simultaneously and sequentially, i.e., by microwave and hot-air action, then nothing (absence of action), then once again microwave and hot-air action, then nothing, and so on, the number of sequences being four.

The total drying time was only 40 seconds, the enamel layer was completely dry, and it possessed excellent adhesion (the enamel layer adheres well to the glass and does not form a crust). At the outlet of the drying apparatus, the window could be handled, since the temperature of the glass was approximately to 50° C.

EXAMPLE 10

An enamel composition was prepared by mixing 80 parts by weight of a powder containing at least a portion of the principal constituents widely used in the enamel industry for glass substrates ($SiO_2$, $Al_2O_3$, $Fe_2O_3$, MnO, MgO, CaO, $B_2O_3$, $TiO_2$, $K_2O$, $Na_2O$, PbO, CuO, CrO) the number of parts of $SiO_2$ added to the parts of $Al_2O_3$ being greater than 50 parts for a total of 100 parts; 20 parts by weight of a medium in the proportion of 10 parts by weight of alkyd resin as organic binding agent and 10 parts by weight of pin oil as organic diluting agent; and 5 parts by weight of graphite, for example "graphite artificial 1476" sold by the company CARBONE-LORRAINE.

The composition was applied by serigraphy on a glass sheet to form a enamelled strip of 30 μm thickness. The glass sheet was inserted in a microwave oven and subjected to microwave energy of 1000 W for 2 minutes and 30 seconds to obtain a dry strip.

Subsequently the glass sheet was inserted in an oven to bake the enamel at approximately 650° C. The baked enamel had good opacity and it was not porous.

EXAMPLE 11

The procedure used in Example 10 was repeated except that carbon black was added as doping agent to the enamelled composition in the proportion of 5 parts by weight, the other constituents and quantities remaining unchanged.

The drying time was 2 minutes and 30 seconds, but after baking, the baked enamel had poorer opacity than that of Example 10 using graphite.

The enamel obtained was slightly porous.

EXAMPLE 12

The procedure used in Example 10 was repeated except that 10 parts of graphite were added.

The drying time was 2 minutes and 15 seconds. After baking the enamel had good opacity and it was not porous.

Control Example 10

The procedure used in Example 10 was repeated without graphite as microwave doping agent.

The drying time was 3 minutes and 25 seconds. When compared with Example 10, this example shows that the use of graphite makes it possible to shorten the duration of drying.

The invention is applicable, in particular, to the manufacture of an enamel layer in the form of a strip, edge, or any other shape and of any size, such as those known and used in motorized vehicle windows, building windows, or mirrors.

Another advantage of the invention lies in the possibility of producing an enamel layer which is thicker and more homogeneous than is the case when using infrared or ultraviolet drying. For example, the invention allows manufacture of a layer having thickness greater than 25 µm, which generally corresponds to the limiting thickness for a layer dried by means of infrared or ultraviolet under industrial conditions. According to the invention, it is possible to manufacture industrially a layer capable of possessing a thickness of approximately 35 µm, while being aware, however, that 30 µm makes it possible to produce highly opaque layers, better than the opacity generally desired for an enamel layer, for example one designed to protect a bond against ultraviolet radiation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a process for manufacturing an enamel layer on at least one portion of a glass substrate in which an enamel compound is deposited on the substrate so as to form a layer, the layer thus formed is dried, and the enameled layer is subsequently melted, the improvement wherein at least one portion of the drying operation is carried out using microwaves,
and wherein the enamel contains a microwave doping agent selected from the group consisting of PbS, carbon black, graphite, copper sulfide, silicon carbide and mixtures thereof.

2. Process according to claim 1, wherein microwave drying is combined with a drying operation chosen from among infrared and blown hot air drying techniques.

3. Process according to claim 2, wherein the microwave drying procedure is combined with blown hot-air drying.

4. Process according to claim 3, wherein the microwave and blown hot air drying operations are conducted simultaneously.

5. Process according to claim 4, wherein the simultaneous microwave and blown hot air drying operations are carried out by alternating drying-action and non-action sequences.

6. A process according to claim 1, wherein the microwave doping agent is selected from the group consisting of carbon black and graphite.

7. Process according to claim 1, wherein the enamel compound contains an aqueous medium.

8. In a process for manufacturing an enamel layer on at least one portion of a glass substrate in which an enamel compound is deposited on the substrate so as to form a layer, the layer thus formed is dried, and the enamelled layer is subsequently melted, the improvement wherein at least one portion of the drying operation is carried out using microwaves, the enamel compound containing graphite as microwave doping agent.

9. In a process for manufacturing an enamel layer on at least one portion of a glass substrate in which an enamel compound is deposited on the substrate so as to form a layer, the layer thus formed is dried, and the enameled layer is subsequently melted, the improvement wherein at least one portion of the drying operation is carried out using microwaves,
and wherein the enamel contains a microwave doping agent selected from the group consisting of PbS, carbon black, copper sulfide, silicon carbide and mixtures thereof.

10. The process according to claim 9, wherein microwave drying is combined with a drying operation selected from the group consisting of infrared and blown hot-air drying.

11. The process according to claim 10, wherein the microwave drying procedure is combined with blown hot-air drying.

12. A process according to claim 11, wherein the microwave and blown hot air drying operations are conducted simultaneously.

13. A process according to claim 12, wherein the simultaneous microwave and blown hot air drying operations are carried out by alternating drying-action and non-action sequences.

14. A process according to claim 9, wherein the enamel compound contains an aqueous medium.

15. A process according to claim 9, wherein the microwave doping agent is carbon black.

16. In a process for manufacturing an enamel layer on at least one portion of a glass substrate in which an enamel compound is deposited on the substrate so as to form a layer, the layer thus formed is dried, and the enamel layer is subsequently melted, the improvement wherein at least one portion of the drying operation is carried out using microwaves and wherein the microwave drying is combined with blown hot-air drying.

17. A procedure according to claim 16, wherein the microwave drying and blown hot-air drying operations are conducted simultaneously.

18. A process according to claim 17, wherein the simultaneous microwave and blown hot-air operations are carried out by alternating drying-action and non-action sequences.

19. A process according to claim 16, wherein the enamel contains at least one constituent capable of absorbing microwave energy.

20. A process according to claim 16, wherein the enamel compound contains an aqueous medium.

* * * * *